US012113320B2

(12) United States Patent
Chen

(10) Patent No.: US 12,113,320 B2
(45) Date of Patent: Oct. 8, 2024

(54) ELECTRICAL CONNECTOR

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 353 days.

(21) Appl. No.: 17/745,859

(22) Filed: May 16, 2022

(65) Prior Publication Data

US 2023/0282994 A1 Sep. 7, 2023

(30) Foreign Application Priority Data

Mar. 7, 2022 (CN) ........................ 202210222680.6

(51) Int. Cl.

*H01R 4/48* (2006.01)
*H01R 11/09* (2006.01)
*H01R 11/22* (2006.01)

(52) U.S. Cl.

CPC ......... *H01R 4/48365* (2023.08); *H01R 11/09* (2013.01); *H01R 11/22* (2013.01)

(58) Field of Classification Search

CPC .... H01R 4/48365; H01R 11/09; H01R 11/22; H01R 13/506; H01R 13/46; H01R 13/5025; H01R 13/5202

See application file for complete search history.

(56) References Cited

U.S. PATENT DOCUMENTS 9,437,940 B1 * 9/2016 Rao ...................... H01R 13/502
9,466,895 B2 * 10/2016 Köllmann ............ H01R 4/5066
10,498,050 B1 * 12/2019 Liang ....................... H01R 9/24
2016/0352028 A1 * 12/2016 Meyer .................... H01R 11/09

* cited by examiner

*Primary Examiner* — Briggitte R. Hammond

(57) ABSTRACT

An electrical connector comprise an insulating housing, a spring clip disposed in the insulating housing, and control pieces for opening the spring clip. The insulating housing comprises outer wall sections separately corresponding to wire inserting spaces defined inside the insulating housing. Each outer wall section at least partially extends into a gap formed by a corresponding control piece when the control pieces are switched to a closed state. Moving spaces are defined on an outside of two sides of each of the outer wall sections. The control pieces perform an opening operation and a closing operation in the moving spaces. When the control pieces are in an open state, the spring clip is observed along the moving spaces. Along a width direction of the spring clip, the spring clip is at least partially exposed in projections of the moving spaces along an up-down direction of the moving spaces.

14 Claims, 17 Drawing Sheets

ELECTRICAL CONNECTOR

TECHNICAL FIELD

The present disclosure relates to a technical field of wiring terminals, and in particular to an electrical connector.

BACKGROUND

Nowadays, terminal clip-type electrical connectors are widely used in various power usage scenarios to achieve effective clamping of electrical conductors.

Chinese patent application NO. 201711103518.8 discloses a terminal clip. An insulating housing of the terminal clip comprises a housing wall section extending gaps of control pieces. The spring clip is shielded in an upward direction by an outer boundary wall of the housing wall section. However, the applicant found that configurations of the housing wall section and the outer boundary wall largely limits free and flexible arrangement of the spring clip arranged inside, so that the spring clip needs to be arranged according to the housing wall section to meet assembly requirements.

In addition, in order to ensure airtightness of an interior of the insulating housing, the outer boundary wall is arranged above and shields the spring clip. Meanwhile, in order to meet visualization purpose of an internal wiring space, at this stage, the insulating housing can only be designed as a transparent plastic shell structure, which increases its limitations and reduces its operability.

SUMMARY

In view of these problems, a purpose of the present disclosure is to provide an electrical connector to solve the problems.

The present disclosure provides an electrical connector. The electrical connector comprise an insulating housing, a spring clip disposed in the insulating housing, and control pieces configured to open the spring clip. The insulating housing comprises outer wall sections separately corresponding to wire inserting spaces defined inside the insulating housing. Each of the outer wall sections at least partially extends into a gap formed by a corresponding control piece when the control pieces are switched to a closed state. Moving spaces are defined on an outside of two sides of each of the outer wall sections. The control pieces perform an opening operation and a closing operation in the moving spaces. When the control pieces are in an open state, the spring clip is observed along the moving spaces. Along a width direction of the spring clip, the spring clip is at least partially exposed in projections of the moving spaces along an up-down direction of the moving spaces.

Furthermore, each of the control pieces comprises two lever arm sections configured to partially insert into the insulating housing in a rotate support manner. The two lever arm sections of each of the control pieces are spaced-apart. Each of the control pieces comprises a crosspiece away from a rotating supporting area of corresponding two lever arm sections. Each crosspiece connects the corresponding two lever arm sections to form a lever arm. When the control pieces are in the closed state, the lever arm sections cooperate with the outer wall sections, so the lever arm sections and the outer wall sections are at least partially arranged above and shield the spring clip corresponding to the moving spaces.

Furthermore, the insulating housing comprises a base and a cover matched with the base. A first side of the base defines wire inserting holes. The cover is detachably engaged with and arranged on a second side of the base. Each of the wire inserting holes is provided with a corresponding outer wall section. Each of the wire inserting holes is arranged opposite to the corresponding outer wall section. The cover and the base are aligned and matched with each other, after the base is docked with the cover, the outer wall sections arrange above the base to shield wire inserting spaces formed in the insulating housing.

In one aspect, the outer wall sections are arranged at intervals on a front end side of the base. Each of the outer wall sections are integrally formed. A first end of each of the outer wall sections is snapped in the cover arranged on a rear end side of the base.

In one aspect, the cover comprises a rear cover portion and the outer wall sections extending outward along the rear cover portion. The outer wall sections extend into a hollow upper portion of the base along a length direction of the outer wall sections. One end of each of the outer wall sections is suspended in the hollow upper portion of the base. The one end of each of the outer wall sections is suspended in the insulating housing. In a suspended manner, an avoidance area is formed in an extending direction of each of the outer wall sections. When the control pieces are in the open sate, the wire inserting spaces are directly observed through the avoidance areas of the outer wall sections. When the control pieces are in the closed state, the avoidance areas are at least partially covered by the crosspieces. The lever arms cooperate with the outer wall sections to at least partially shield portions of the spring clip corresponding to the moving spaces close to the avoidance areas.

By adopting above technical solutions, In the electrical connector of the present disclosure, the outer wall sections are formed on the insulating housing, and the spring clip arranged inside the electrical connector are at least partially exposed through the moving spaces outside two sides of each of the outer wall sections, so the spring clip is not limited by the outer wall sections, and is freely arranged in the insulating housing. Especially, when the control pieces are switched to the open state, a user is able to at least observe the spring clip located in the insulating housing along the moving spaces. The spring clip is exposed at least exposed to the projections of the moving spaces in the width direction of the spring clip, which on one hand is conducive to optical visualization operations, and on the other hand greatly improves heat dissipation of the overall insulating housing, assembly of the insulating housing and maintenance of the insulating housing.

In the present disclosure, when the control pieces are switched to the closed state, through cooperation between the lever arm sections and the outer wall sections, the control pieces at least partially shield the spring clip, especially shield the spring clip along the width direction of the spring clip. Therefore, when wires are inserted in and there is no need to observe wires in the interior of the electrical connector, the control pieces further shield the portions of spring clip exposed to an outside to improve the internal tightness of the electrical connector.

In one embodiment of the electrical connector, the outer wall sections are arranged at intervals on the front end side of the base. Each of the outer wall sections are integrally formed. The first end of each of the outer wall sections is snapped in the cover to achieve a stable combination purpose. In particular, a second end of each of the outer wall sections forms a step position. The step positions are matched with the crosspieces and the gaps of the control pieces thereby defining a horizontal position of each of the control pieces in the closed state.

In one embodiment of the electrical connector, the outer wall sections are formed in a direction in which the rear cover portion of the cover extends outward. By suspending one end of each of the outer wall sections in the insulating housing, the avoidance area is formed on an outward extension path of the one end of each of the outer wall sections. The user is able to observe a wiring situation of the wire inserting spaces in real time through the avoidance areas to avoid problems such as improper clamping of the wires. Therefore, the interior of the wire inserting spaces are observed intuitively by directly providing the avoidance areas on the insulating housing, so the insulating housing is no need to be transparent. Thus, it is flexible and efficient in material selection and operation of the insulating housing, which improves user experience.

The avoidance areas provided in the insulating housing are only exposed when the control pieces are in the open state, which happens to be a process of inserting the external wires to the wire inserting spaces. The avoidance areas ensure that the wires enters the wire inserting spaces according to a predetermined inserting path, which is convenient for the user to adjust the inserting posture in real time.

After the wires are inserted into the electrical connector, the control pieces are switched to the closed state. At this time, the avoidance areas are at least partially shielded by the crosspieces of the control pieces. The lever arms and the outer wall sections cooperate with each other to shield the portions of the spring clip close to the avoidance areas, so that portions of the moving spaces and the avoidance areas are shielded, which achieves a purpose of closing the wire inserting spaces and meets requirements of the electrical connector for clamping the wires.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and should not be regarded as limitations to the present disclose. Those skilled in the art are able to obtain other drawings according to the drawings without contributing any inventive labor.

In the drawings.

Figure 1:
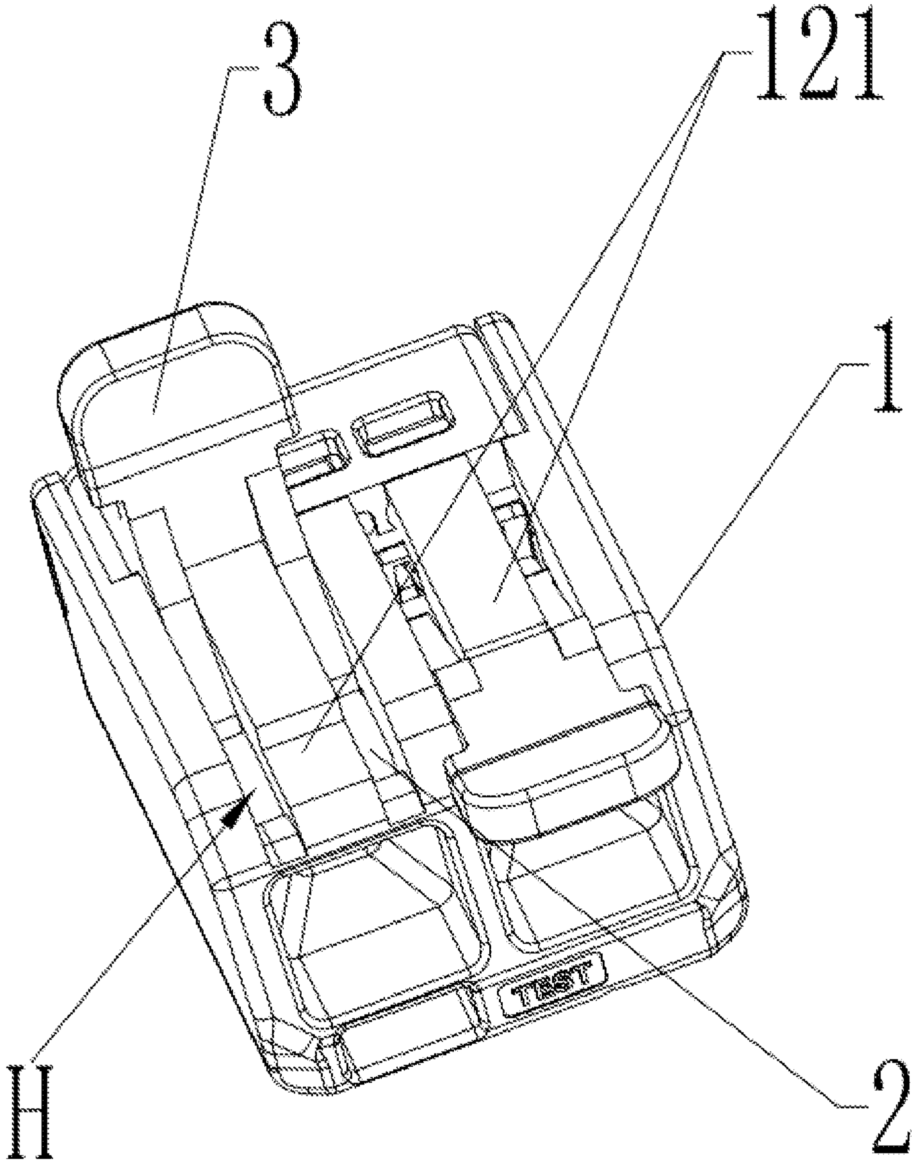
FIG. 1 is a schematic diagram of an electrical connector according to one embodiment of the present disclosure.

- 1—insulating housing; 11—base; 111—hollow upper portion; 112—wire inserting hole; 113—partition portion; 114—fitting groove; 115—first detecting port; 12—cover; 121—outer wall section; 1211—step position; 122—notch structure; 123—bending portion; 124—T-shaped snap; 125—second detecting port; 126—through hole;
- 2—spring clip; 21—clamping spring; 211—support portion; 212—spring bow portion; 213—frame portion; 2131—side edge; 2132—retaining edge; 2133—wire passing window; 214—clip edge portion; 2141—contact section; 2142—concave position; 2143—clip section; 22—bus bar; 221—extending portion;
- 3—control piece; 31—lever arm section; 32—crosspiece; 33—control section;

K—gap; H—moving space; S—avoidance area.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments.

Embodiment

As shown in FIGS. 1-20, the present disclosure provides an electrical connector. The electrical connector comprise an insulating housing 1, a spring clip 2 disposed in the insulating housing 1, and control pieces 3 configured to open the spring clip 2. Each of the control pieces 3 comprises two lever arm sections 31 configured to partially rotatably insert into and support the insulating housing 1. The two lever arm sections of each of the control pieces are spaced-apart. Each of the control pieces comprises a crosspiece 32 away from a rotating supporting area of corresponding two lever arm sections 31. Each crosspiece 32 connects the corresponding two lever arm sections 31 to form a lever arm. The insulating housing 1 comprises outer wall sections 121 separately corresponding to wire inserting spaces defined inside the insulating housing 1. Each of the outer wall sections 121 at least partially extends into a gap K formed by a corresponding control piece 3 when the control pieces 3 are switched to a closed state. Moving spaces H are defined at an outside of two sides of each of the outer wall sections 121.

When the control pieces 3 are in an open state, the spring clip 2 is observed along the moving spaces H. Along a width direction of the spring clip 2, the spring clip 2 is at least partially exposed in projections of the moving spaces H along an up-down direction of the moving spaces H. In the electrical connector of the present disclosure, the outer wall sections 121 are formed on the insulating housing 1, and the spring clip 2 arranged inside the insulating housing 1 is at least partially exposed through the moving spaces H outside two sides of each of the outer wall sections 121, so the spring clip 121 is not limited by the outer wall sections 121, and is freely arranged in the insulating housing 1. Especially, when the control pieces 3 are switched to the open state, a user is able to at least observe the spring clip 2 located in the insulating housing 1 along the moving spaces H. The spring clip 2 is at least partially exposed to the projections of the moving spaces H in the width direction of the spring clip 2, which on one hand is conducive to optical visualization operations, and on the other hand greatly improves heat dissipation of the overall insulating housing, assembly of the insulating housing and maintenance of the insulating housing.

In one embodiment, when the control pieces 3 are in the closed state, the lever arm sections 31 cooperate with the outer wall sections 121, so the lever arm sections 31 and the outer wall sections 121 are at least partially arranged above and shield the spring clip 2 corresponding to the moving spaces H. When the control pieces 3 are switched to the closed state, through cooperation between the lever arm sections 31 and the outer wall sections 121, the control pieces 3 at least partially shield the spring clip 2, especially shield the spring clip 2 along the width direction of the spring clip. Therefore, when wires are inserted in and there is no need to observe wires in an interior of the electrical connector, the control pieces 3 further shield the portion of the spring clip 2 exposed to an outside to improve the internal tightness of the electrical connector.

As shown in FIGS. 3-5 and 10-12, the insulating housing 1 comprises a housing body. The housing body comprises a base 11 and a cover matched with the base 12. A first side of the base 11 defines wire inserting holes 112. The cover 12 is detachably engaged with and arranged on a second side of the base 11. Each of the wire inserting holes 112 is matched with a corresponding outer wall section 121. Each of the wire inserting holes is arranged opposite to the corresponding outer wall section. The cover 12 and the base 11 are docked and matched with each other. After the base 11 is docked with the cover 12, the outer wall sections 121 are arranged above the base 11 to shield wire inserting spaces formed in the housing body.

The base 11 and the cover 12 are engaged with each other to form the whole insulating housing. The outer wall sections 121 and partition portions 113 on the housing body are spaced apart from each other to form the moving spaces H, which on the one hand facilitate the user to directly observe the interior of the insulating housing, and on the other hand are convenient for state switching of the control pieces 3 and make a laid out of the control pieces good. In particular, each of the wire inserting holes 112 is matched with a corresponding outer wall section 121. The outer wall sections 121 are arranged above the base to shield the sire inserting spaces.

As shown in FIGS. 1-5, the outer wall sections 121 are arranged at intervals on the front end side of the base 11. Each of the outer wall sections 121 is integrally formed. A first end of each of the outer wall sections 121 is snapped in the cover 12, which further improves efficient disassembly and docking between the cover 12 and the base 11. In the embodiment, specifically, a second end of each of the outer wall sections 121 is sunken to forms a step position 1211. Each gap K formed by the corresponding control piece 3 is formed between the two lever arm sections 31 of the corresponding control piece 3. Each gap K formed by the corresponding control piece 3 is spaced from the step position 1211 of a corresponding outer wall section 121 by the crosspiece 32 of the corresponding control piece 3, so each crosspiece 32 is at least partially received in a corresponding stepped position 1211. When the control pieces 3 are in the closed state, the control pieces 3 are horizontally limited on the base 11. In the present disclosure, the outer wall sections 121 are arranged at intervals on the front end side of the base 11. Each of the outer wall sections 121 are integrally formed. The first end of each of the outer wall sections 121 is snapped in the cover 12 to achieve a stable combination purpose. In particular, the second end of each of the outer wall sections forms the step position 1211. The step positions 1211 are matched with the crosspieces 32 and the gaps K of the control pieces 3, thereby defining a horizontal position of each of the control pieces 3 in the closed state.

In one embodiment, as shown in FIGS. 6-12, the outer wall sections 121 are arranged on one side of the cover 12. The cover 12 comprises a rear cover portion and the outer wall sections 121 extending outward along the rear cover portion. The outer wall sections 121 extend into a hollow upper portion 111 of the base 11 along a length direction of the outer wall sections 121. One end of each of the outer wall sections 121 is suspended in the hollow upper portion 111 of the base 11.

Specifically, the one end of each of the outer wall sections 121 is suspended in the insulating housing 1. An avoidance area S is formed in an extending direction of each of the outer wall sections 121. When the control pieces 3 are in the open sate, the wire inserting spaces are directly observed through the avoidance areas S of the outer wall sections 121. When the control pieces 3 are in the closed state, the avoidance areas S are at least partially covered by the crosspieces 32. The lever arms cooperate with the outer wall sections 121 to at least partially arrange above and shield the spring clip 2 corresponding to the moving spaces H close to the avoidance areas S.

In the present disclosure, by suspending one end of each of the outer wall sections 121 in the insulating housing 1, the avoidance areas S are formed on an outward extension path of the one end of each of the outer wall sections 121. The user is able to observe a wiring situation of the wire inserting spaces in real time through the avoidance areas S to avoid problems such as improper clamping of the wires. Therefore, the interior of the wire inserting spaces are observed intuitively by directly providing the avoidance areas S on the insulating housing, so the insulating housing is no need to be transparent. Thus, it is flexible and efficient in material selection and operation of the insulating housing, which improves user experience.

The avoidance areas S provided on the insulating housing 1 are only exposed when the control pieces 3 are in the open state, which happens to be a process of inserting the external wires to the wire inserting spaces. The avoidance areas S ensure that the wires enter the wire inserting spaces according to a predetermined inserting path, which is convenient for the user to adjust the inserting posture in real time. After the wires are inserted into the electrical connector, the control pieces 3 are switched to the closed state. At this time, the avoidance areas S are at least partially shielded by the crosspieces of the control pieces 3. The lever arms and the outer wall sections 121 cooperate with each other to arrange above and shield the spring clip 2 close to the avoidance areas S, so that portions of the moving spaces and the avoidance areas S are shielded, which achieves a purpose of closing the wire inserting spaces and meets requirements of the electrical connector for clamping the wires.

Figure 2:
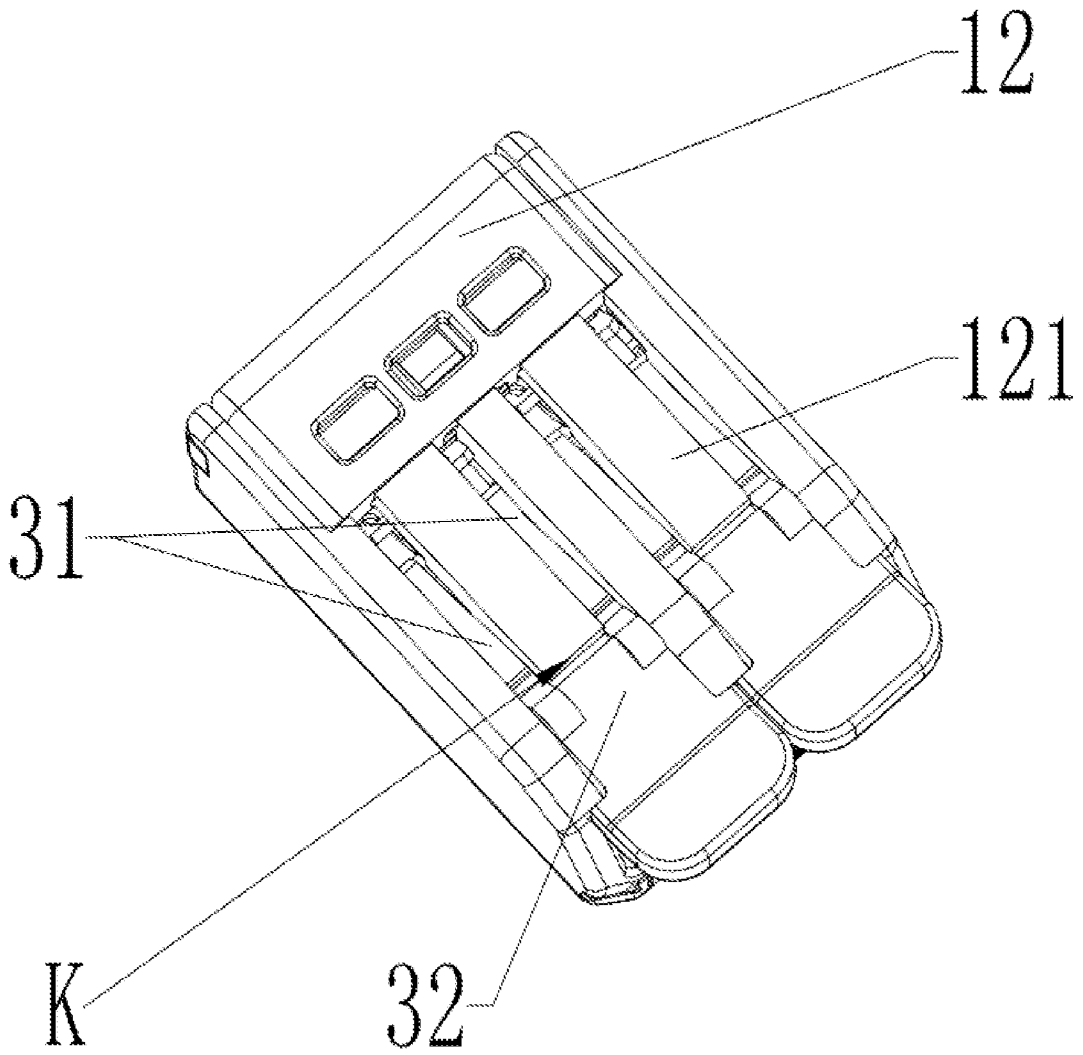
FIG. 2 is a schematic diagram of the electrical connector according to one embodiment of the present disclosure where a control piece shown in FIG. 1 is switched to a closed state.
Figure 7:
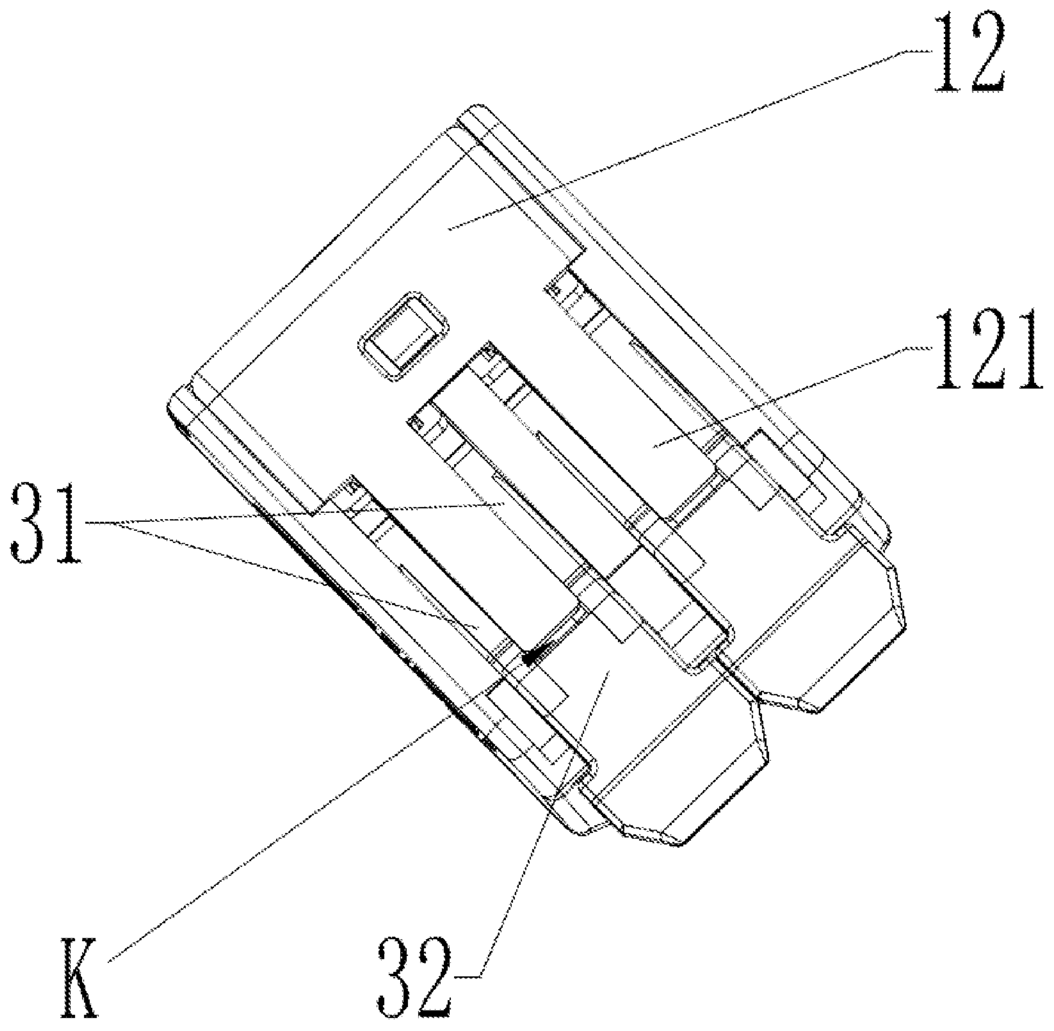
FIG. 7 is a schematic diagram of the electrical connector according to another embodiment of the present disclosure where a control piece shown in FIG. 6 is switched to a closed state.
Figure 8:
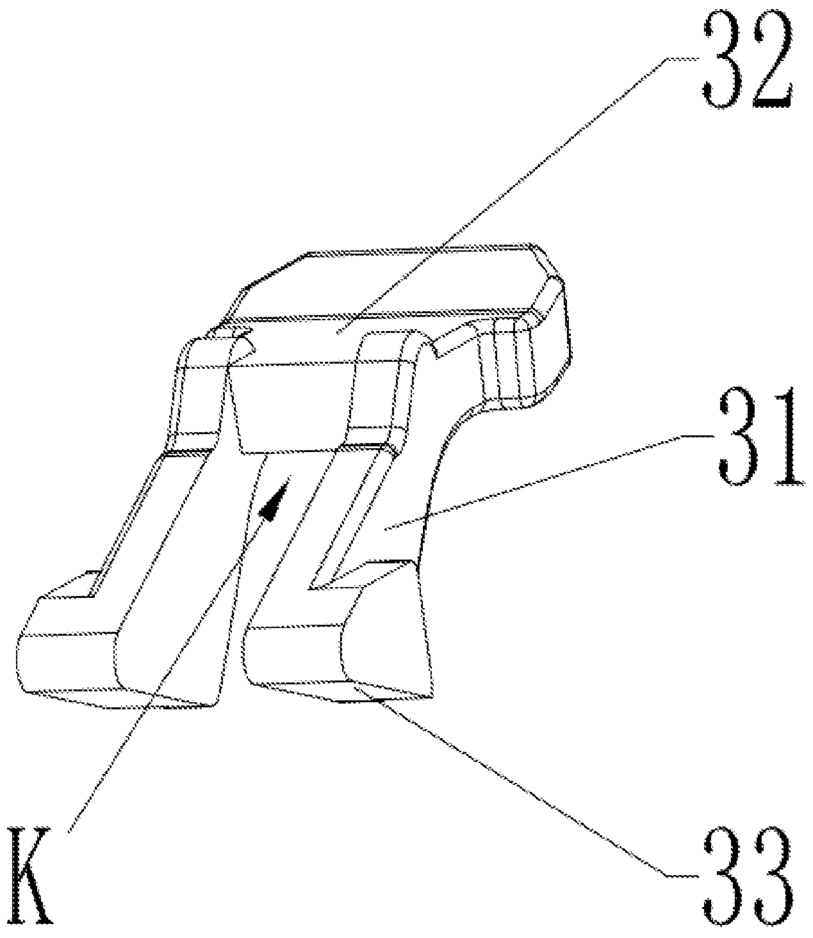
FIG. 8 is a schematic diagram of the control piece of the electrical connector according to one embodiment of the present disclosure.
Figure 9:
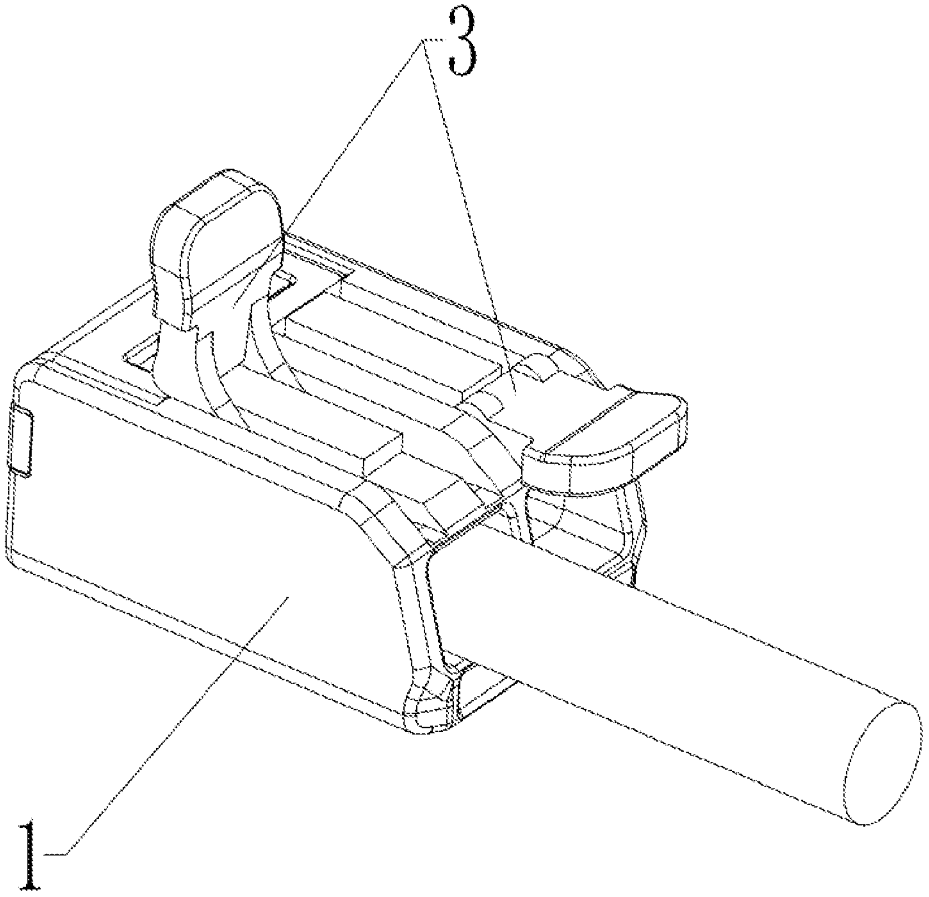
FIG. 9 is a schematic diagram of the electrical connector shown in a configuration of use according to another embodiment of the present disclosure.

As shown in FIGS. 2, 7, and 8, in the embodiment, each gap K formed by the corresponding control piece is formed between the two lever arm sections 31 of the corresponding control piece 3 and is spaced apart from the one end of a corresponding outer wall section 121 by the crosspiece 32 of the corresponding control piece 3, so that each crosspiece 32 at least partially fills the avoidance area S of a corresponding outer wall section 121. The gaps K ensure that the control pieces 3 do not interfere with the outer wall sections 121 during an opening process or a closing process of the control pieces 3. The gaps K form a boundary of the electrical connector with the suspended end of the outer wall sections when the control pieces 3 are in the closed state, so that on the basis of satisfying the witching between the open state and the closed state of the control pieces 3, the control pieces further cooperate with the outer wall section s121 to arrange above the spring clip 2 and shield the spring clip 2.

Obviously, after the wires are inserted into the wire inserting spaces, the wires passes through accommodating spaces formed by the gaps K between the lever arm sections 31. At this time, the gaps are within clamping position of the spring clip 2.

The wire inserting holes 112 are on the insulating housing 1. The avoidance areas S are located on an upper side of the wire inserting holes 112. An edge of the one end of each of the outer wall sections 121 and an oblique end of a corresponding wire inserting hole 112 are mutually dislocated. In the embodiment, the wire inserting holes 112 are correspondingly on the front end side wall of the base 11. An inner side of a side wall of the base is configured as a slope shape, and the inner side of the side wall of the base is arched upwards. Each of the crosspieces 32 comprises a concave area corresponding to the arcuate arch at a corresponding position, so that the lever arm of the control pieces are horizontally placed on the insulating housing when the control pieces 3 are switched to the closed state.

In the embodiment, the oblique ends of the wire inserting holes 112 are formed on the slope shaped side wall of the base. The one end of each of the outer wall sections 121 and the oblique end of the corresponding wire inserting hole 112 are mutually dislocated to form one wire inserting space that is directly observed by the user. The spring clip 2 is hidden in the projections of the outer wall sections 121 along its length direction. The spring clip 2 is at least extended and exposed in the moving spaces H along the width direction of the spring clip. When the control pieces 3 are in the open state, the spring clip 2 is exposed in the moving spaces H close to the avoidance areas S along the width direction of the spring clip 2. When the control pieces 3 are switched to the closed state, the spring clip 2 is shielded by at least the lever arm section 31 and the outer wall sections 121 in the width direction of the spring clip 2.

The cover 12 comprises the rear cover portion. The outer wall sections 121 extend outward to form on the rear cover portion. The avoidance areas S are formed on one end side of the hollow upper portion 111 of the base 11 that is not filled by the outer wall sections 121. The user directly observes the real-time status of the wires in the internal inserting spaces during the process of inserting or pulling out the wires through the avoidance areas S. The avoidance areas S are formed between ends of the suspended outer wall sections 121 and the hollow upper portion 111 of the base 11. The avoidance areas S are located at one end side adjacent to the wire inserting holes 112.

The rear cover portion is docked with the base 11 to make the outer wall sections 121 arrange above and shield the base 11, so as to shield the wire inserting spaces formed in the housing body of the insulating housing. Therefore, the base 11 and the cover 12 are engaged with each other to form the whole housing body. The rear cover portion of the cover 12 extends outward to form the outer wall sections 121. The rear cover portion is docked with the base 11 to form the whole insulating housing. At this time, the outer wall sections 121 are arranged above the base 11, thereby covering the wire inserting spaces inside the insulating housing. On the one hand, portions of the control pieces 3 are inserted into and rotatably support the base 11, and the outer wall sections 121 are extended and formed on the back cover portion of the cover 12, which greatly reduces burden of an overall structure of the base 11, so the base 11 and the cover 12 bear contact stress of the control pieces 3 together during the opening and closing process of the control pieces 3, which significantly improve the stability and service life of the overall structure of the insulating housing. On the other hand, the space is provided above the base 11 for accommodating the outer wall sections 121. The space is exposed when the base 11 is separated from the cover 12, so it is convenient for daily maintenance of the wire inserting spaces and the spring clip and it is convenient for quick disassembly of the spring clip 2, which significantly simplifies the operation of the electrical connector.

Specifically, the outer wall sections 121 extend into the hollow upper portion 111 of the base 11 along the length direction of the outer wall sections 121. One end of each of the outer wall sections 121 is suspended in the hollow upper portion 111. The moving spaces H are defined on the outside of two sides of each of the outer wall sections 121. The portions of the control pieces 3 are inserted into and rotatably support the base from the moving spaces H. The avoidance areas S are form on the extending direction of the outer wall sections 121 suspended in the hollow upper portion 111, which facilitates the direct observation of the wire inserting spaces when the control pieces 3 are in open positions. When the control pieces 3 are in the closed state, the avoidance areas S are at least partially covered by the crosspieces 32. The lever arms cooperate with the outer wall sections 121 to at least partially shield the spring clip 2 corresponding to the moving spaces H close to the avoidance areas S.

Figure 11:
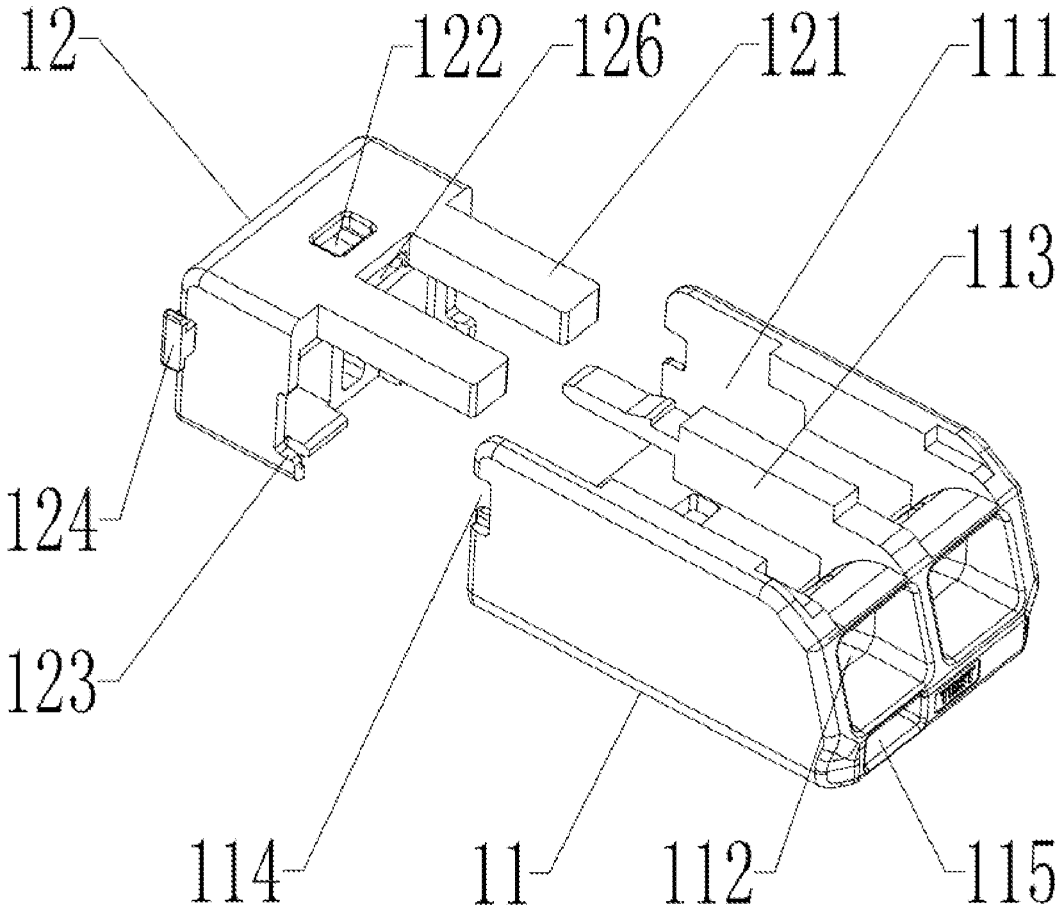
FIG. 11 is an exploded schematic diagram of the insulating housing shown in FIG. 10.

As shown in FIG. 11, each of the outer wall sections 121 is in a shape of a long plate. Each of the outer wall sections 121 in the shape of the long plate is integrally formed on the outer side of the rear cover portion, which is convenient for molding and manufacturing the cover 12, and achieves a good and simple covering effect.

In one embodiment, the rear cover portion is of a rectangular frame structure, and the outer wall sections 121 are integrally formed on an upper frame portion of the rectangular frame structure and are flush with an outer wall of the upper frame portion. In the embodiment, the rectangular frame structure is a hollow frame body. A thickness of each of the outer wall sections 121 is equal to a thickness of the rectangular frame structure. That is, the outer wall sections 121 are flush with an inner wall of the upper frame portion.

Figure 3:
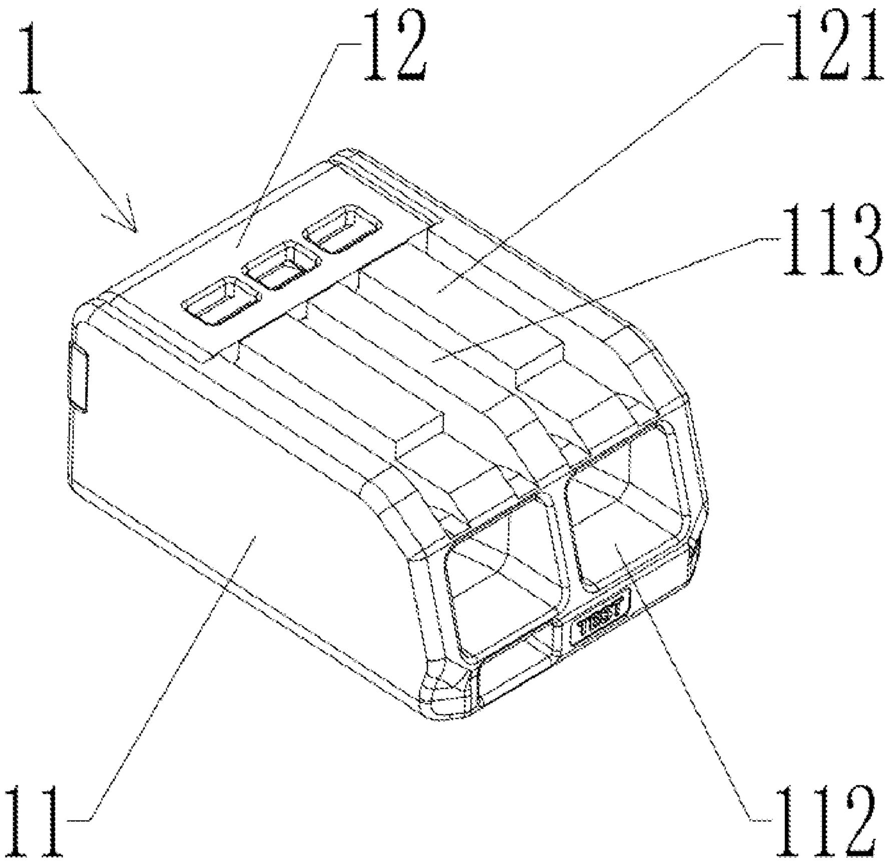
FIG. 3 is a schematic diagram of an insulating housing of the electrical connector according to one embodiment of the present disclosure.
Figure 4:
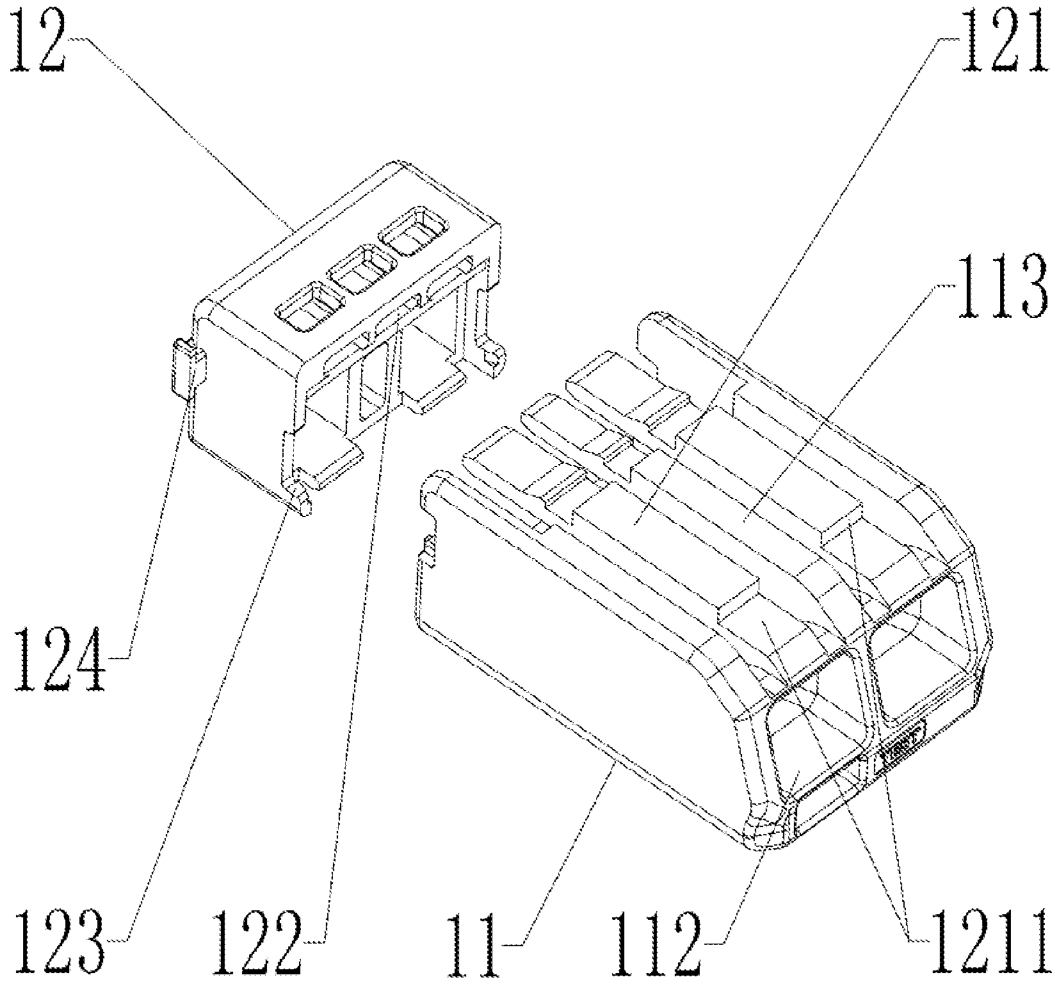
FIG. 4 is an exploded schematic diagram of the insulating housing shown in FIG. 3.
Figure 5:
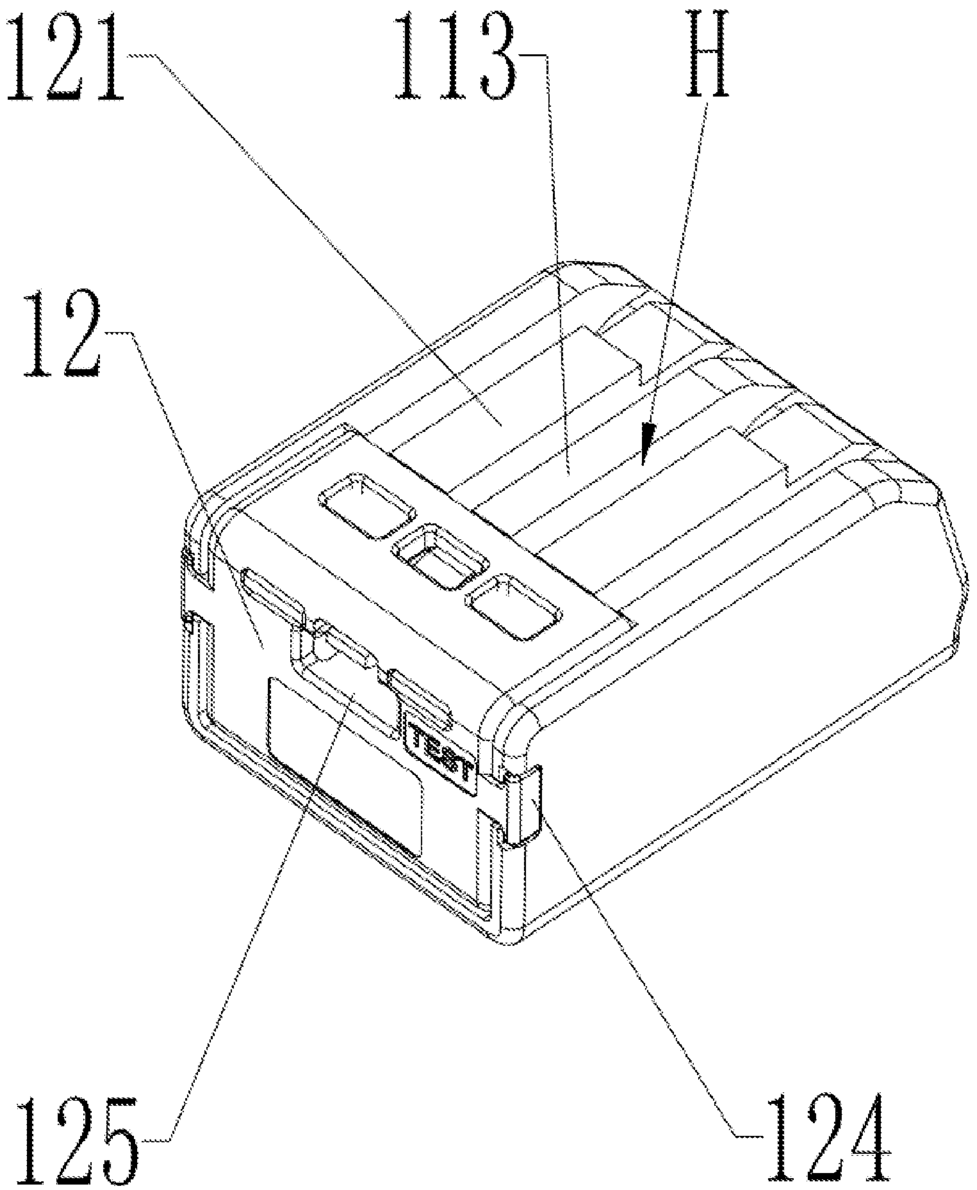
FIG. 5 is another schematic diagram of the insulating housing shown in FIG. 3.
Figure 6:
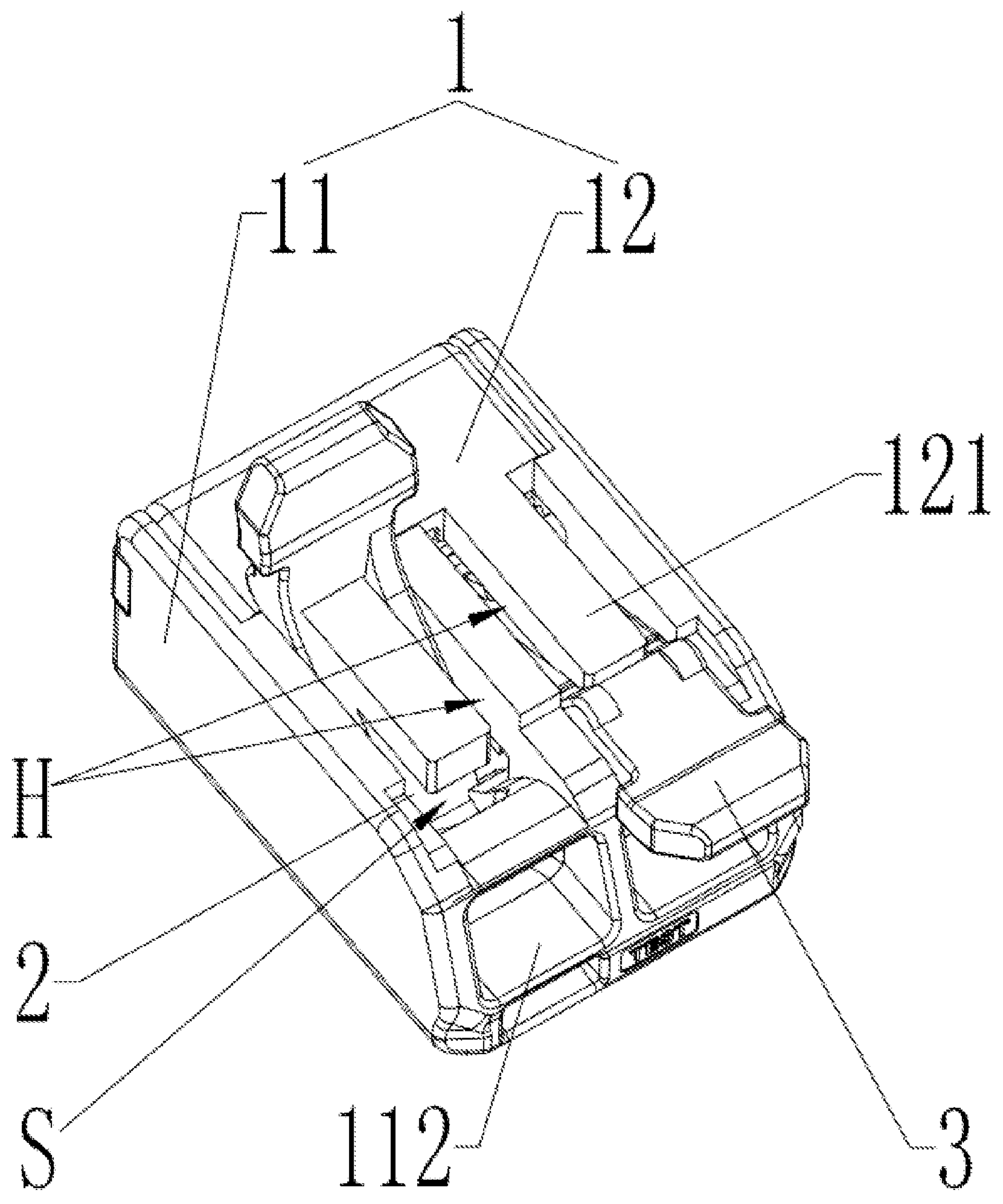
FIG. 6 is a schematic diagram of the electrical connector according to another embodiment of the present disclosure.
Figure 10:
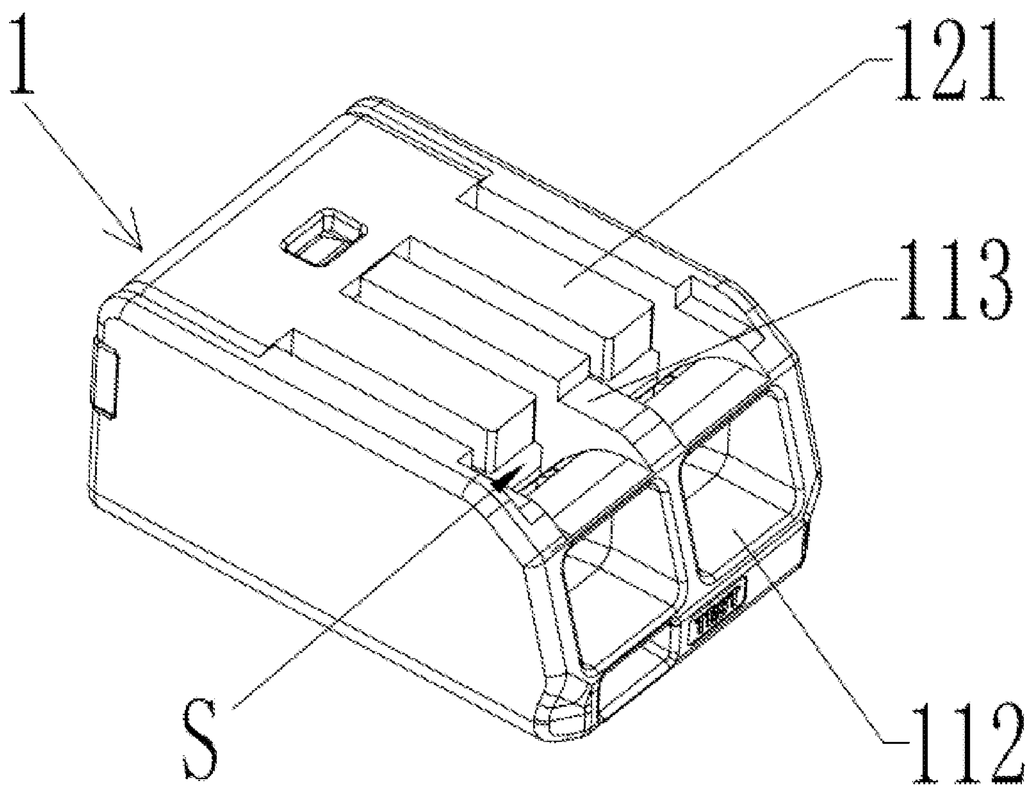
FIG. 10 is another schematic diagram of the insulating housing of the electrical connector according to another embodiment of the present disclosure.

As shown in FIG. 3 and FIG. 10, in the above-mentioned embodiments, a partition portion 113 is arranged between two adjacent wire inserting holes 112. The front end side of the base 11 extends backward to form the partition portion 113. The partition portion 113 is flush with the outer wall sections 121. The partition portion 13 cooperates with the outer wall sections 121 to forms portions of the moving spaces H. The partition portion 113 is docked with the rear cover portion, therefore, the outer wall section 121 extending outward along the rear cover portion are flush with the outer wall of the upper frame portion of the rear cover portion. The partition portion 113 of the base 11 extending along the hollow upper portion 111 and between the adjacent wire inserting holes 112 is flush with the outer wall sections 121. The base 11 is inserted into the rear cover portion through the partition portion 113 to improve the disassembly stability between the base and the cover. These components are arranged flush with each other to form the insulating housing, so the shape of the insulating housing is coordinated, thereby enhancing brand recognition.

Specifically, one end of the partition portion 113 is configured as a snap structure, and the rear cover portion correspondingly has a notch structure 122 matching the snap structure. The rear cover portion comprises a through hole 126 connected with the one end of the partition portion 113. Further, the snap structure is formed on an upper end surface of an end portion of the rear cover portion. The notch structure 122 is formed on the upper frame portion of the rear cover portion and is communicated with the through hole 126. Obviously, the partition portion 113 serves as a partition structure for the wire inserting holes 112, and clearly defines each individual wire inserting space in the insulating housing. The partition portion 113 is configured as a wire inserting guiding structure of the wire inserting holes, which is convenient for alignment and assembly between the cover 12 and the base 11, and further improves the stability and effectiveness of the disassembly and assembly of the insulating housing.

Obviously, when the provided control pieces 3 are switched to the closed state, the outer wall sections 121 cooperate with the partition portion 113 to cover the wire inserting spaces in a width direction of the insulating housing.

Figure 12:
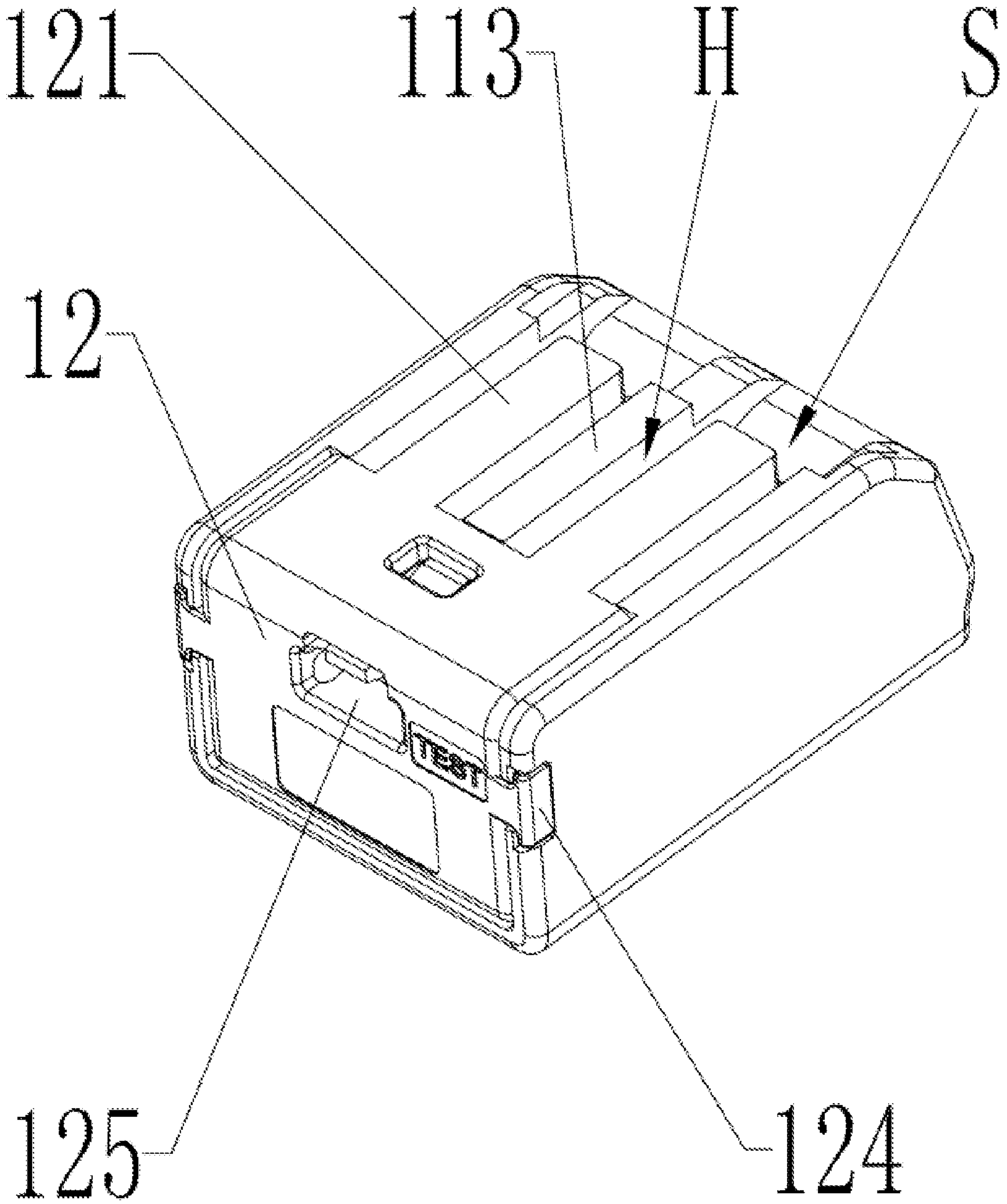
FIG. 12 is another schematic diagram of the insulating housing shown in FIG. 10.

As shown in FIG. 10 and FIG. 12, in one embodiment, the partition portion 113 is integrally formed on the front end side of the base 11. The outer wall sections 121 are flush with the partition portion 113. The moving spaces H of the control pieces 3 are in the hollow upper portion 111 and are formed between the outer wall sections 121 and the partition portion 113. When the control pieces 3 are switched to the closed state, the outer wall sections 121 cooperate with the partition portion 113 to shield the wire inserting spaces in the width direction of the insulating housing. Therefore, when the control pieces 3 are in the closed state, the hollow upper portion 111 is at least shielded by the control pieces 3 and the outer wall sections 12, which make the electrical connector airtight and safe during electrical work.

As shown in FIG. 11, a lower frame portion of the rectangular frame structure extends outwardly to form a bending portion 123 connected with an inner wall of the base 11. An outer wall of the lower frame portion is embedded in the base 11. The lower frame portion of the rectangular frame structure comprises another snap structure. T-shaped snaps 124 are arranged on left side and right side of the rectangular frame structure. Fitting grooves 114 are correspondingly formed on an outer edge of the base 11. The fitting grooves are detachably connected with the T-shaped snaps 124. In particular, the T-shaped snaps 124 are integrally from on the rear frame portion of the rectangular frame structure. The T-shaped snaps 124 separately extended from an outer wall of the rear frame portion of the rectangular frame structure toward. The T-shaped snaps 124 are configured as mounting ears. The T-shaped snaps 124 are connected with the fitting grooves 114 when the cover 12 is connected with the base 11. At this time, the lower frame portion of the rectangular frame structure is directly embedded and accommodated in the inner wall of the base 11. By such configuration, the two sides of the back cover portion tightly connect with the two side edges 2131 of the base 11 to prevent the cover from separating from the base due to frequent opening and closing of the control pieces 3. The T-shaped snaps 124 are direct docked with the fitting grooves 114 in a horizontal direction, so that the T-shaped snaps 124 are always connected with the fitting grooves 114 in an opening and closing direction of the control pieces 3, which facilitates the assembly of the cover 12 and the base 11.

Figure 13:
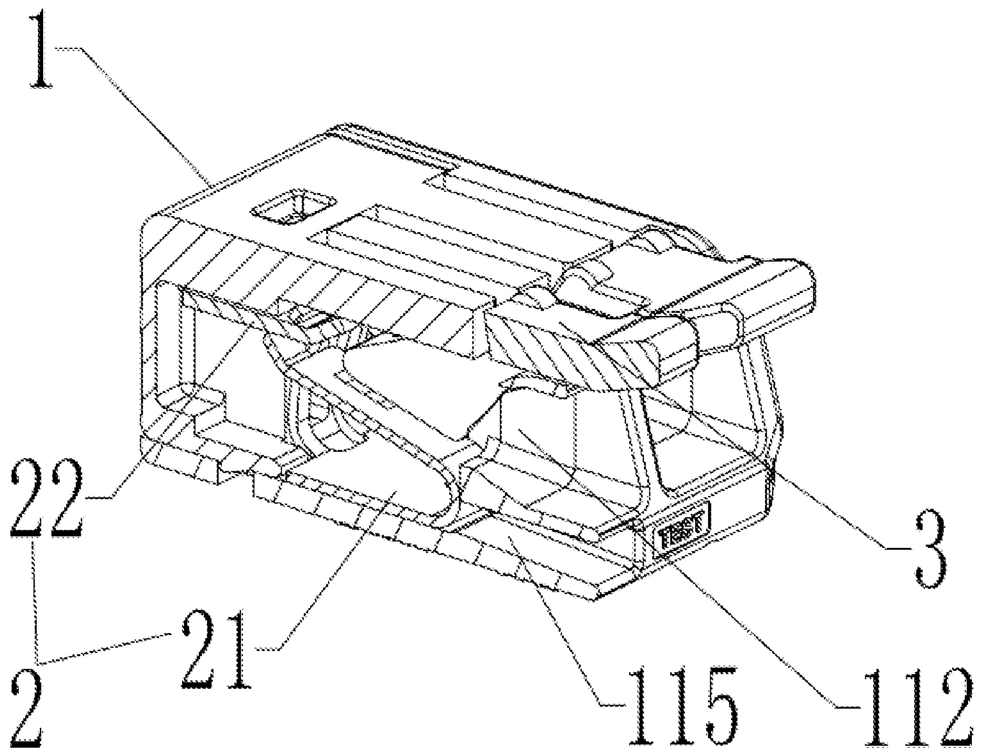
FIG. 13 is a cross-sectional schematic diagram of the electrical connector according to one embodiment of the present disclosure.
Figure 14:
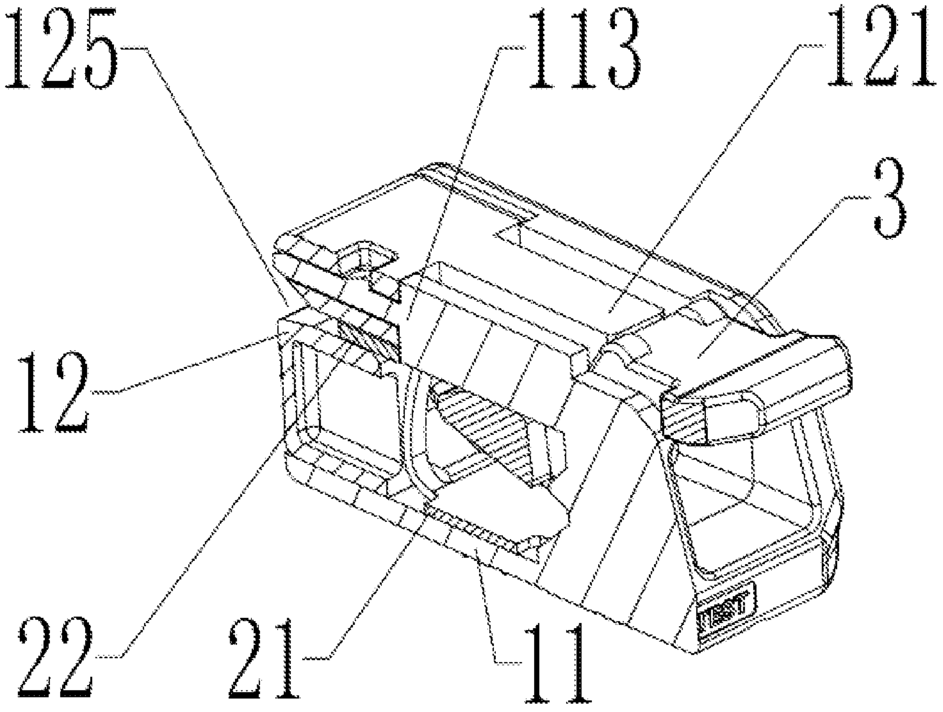
FIG. 14 is another cross-sectional schematic diagram of the electrical connector according to one embodiment of the present disclosure.

In one embodiment, as shown in FIG. 13, a first detecting port 115 facing a clamping spring 21 is provided below at least one of the wire inserting holes 112. As shown in FIG. 14, the rear cover portion defines a second detecting port 125 facing a bus bar 22. The first detecting port 115 is communicated with the clamping spring 21, and the second detecting port 125 is communicated with the bus bar 22, so that the causes of failures such as electrical connection failures are quickly checked, and corresponding maintenance is performed on metal connecting pieces.

As shown in FIGS. 15-19, in one embodiment, the spring clip 2 comprises clamping springs 21 and a bus bar 22, which cooperate to form clamping positions of the wires. The wire inserting spaces are formed between the wire inserting holes 112 and the clamping positions. Specifically, each of the clamping spring 21 comprises a support portion 211, a spring bow portion 212 connected with a first end of the support portion 211, and a frame portion 213 connected with a second end of the support portion 211. Each spring bow portion 212 extends toward the bus bar 22 to form a clip edge portion 214. Each frame portion 213 extends from a corresponding support portion 211 and is connected with the bus bar 22 to form one clamping position between the bus bar 22 and a corresponding clip edge portion 214. Each clip edge portion 214 has a contact section 2141. Each of the control pieces 3 presses on a corresponding contact section 2141. Each contact section 2141 is widened along two sides of each clamp edge section 214, and is bent inward to form concave positions 2142. Each of the control pieces presses on corresponding concave positions 2142 and is limited by the corresponding concave positions 2142.

In the above-mentioned spring clip 2, with each support portion 211 on the corresponding clamping spring 21 as a center, each spring bow portion 212 and each frame portion 213 are connected on two sides of each support portion. Each frame portion 213 is arranged on the corresponding clamping spring 21, and is connected to the bus bar 22, so each clamping spring 21 is tightly connected with the bus bar 22. Each spring bow portion 212 extends toward the bus bar 22 and comprises the clip edge portion 214. Each clip edge portion 214 forms one clamping position with the bus bar 22 after the bus bar 22 is connected with the clamping springs 21. Therefore, the external wires are elastically clamped in the clamping positions. Which significantly improve clamping efficiency.

Each contact section 2141 is formed on each clip edge portion 214 of each clamping spring 21. Each contact section 2141 is widened along the two sides of the corresponding clip edge portion 214, so as to increase a pressure contact area with the corresponding control piece 3, and improve pressing operability of the corresponding control piece 3 on the clip edge portion 214.

In particular, each contact section 2141 is bent inwardly to form two concave positions 2142. When the control pieces 3 is switched to the open state, each of the control pieces 3 is stably limited in the corresponding concave positions 2142, so it is ensured that the control pieces 3 are kept in this position and the wires are inserted into the clamping positions. Further, the concave positions 2142 are matched with and connected with control sections 33 of the control pieces 3 when the control pieces 3 are in the open state. The user can clearly feel the frustration of switching of the control pieces, which is convenient for prompting the user to switch the control pieces 3 in place, and increases damping force on the control pieces 3 during the switching process.

Figure 16:
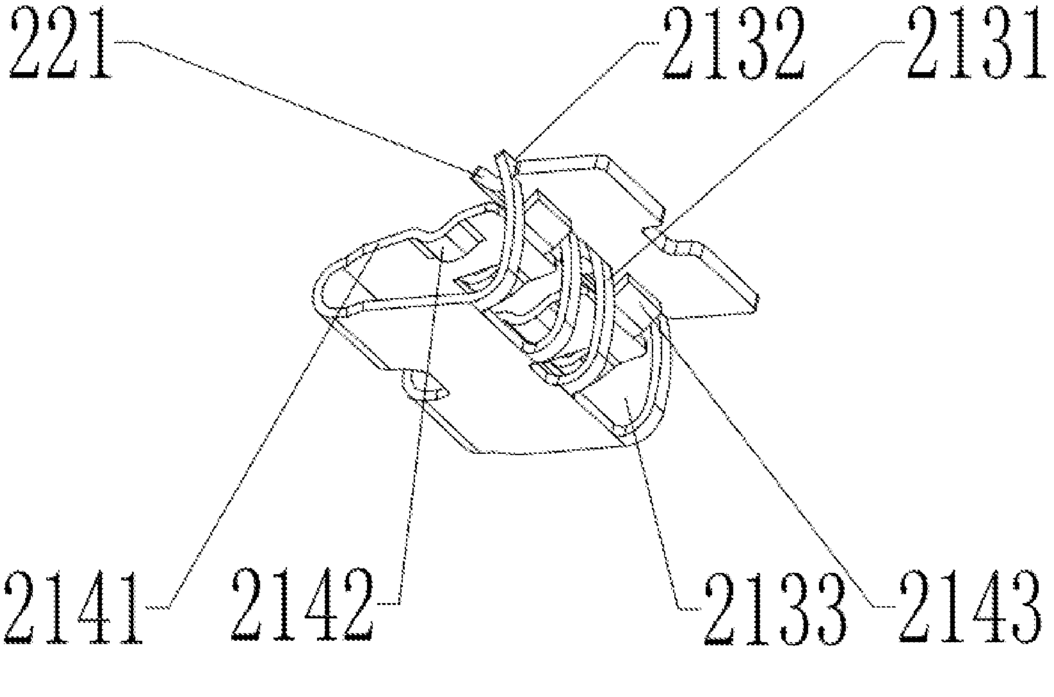
FIG. 16 is another schematic diagram of the spring clip g shown in FIG. 15.
Figure 18:
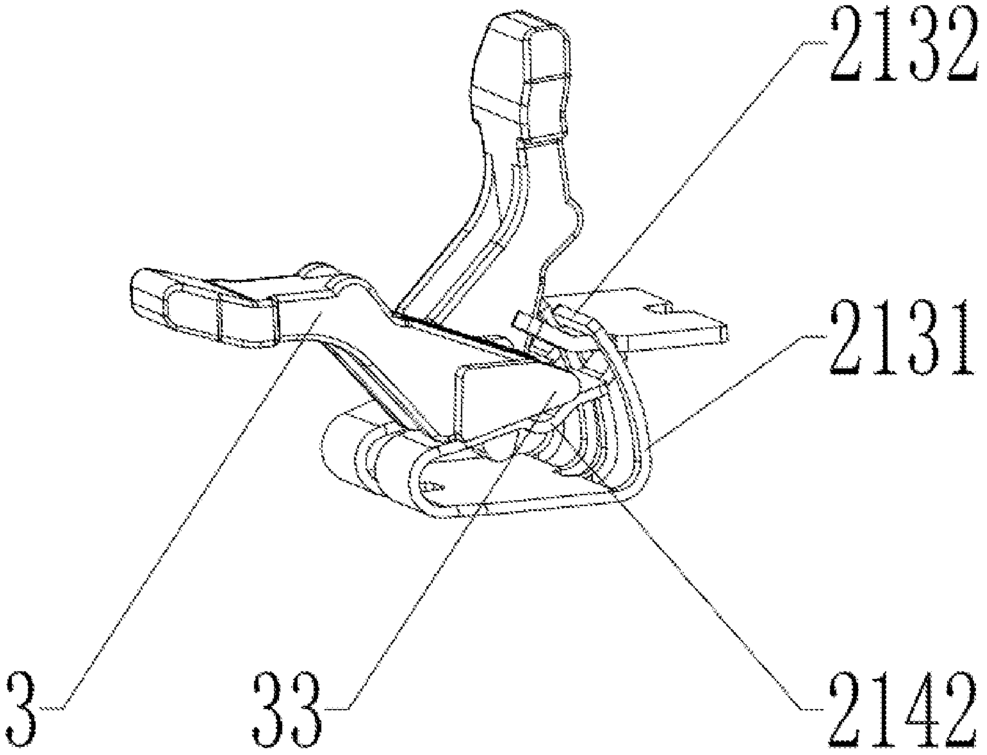
FIG. 18 is a schematic diagram of the spring clip and the control pieces of the electrical connector according to one embodiment of the present disclosure.

As shown in FIG. 16 and FIG. 18, in one embodiment, each concave position 2142 is of a semi-circular arc shape, and each two semi-circular arc shaped concave positions 2142 are oppositely arranged on two sides of each clip edge portion 214 along its width direction. When the control pieces are pressed to open the clamping positions, the control sections 33 of the control pieces 3 are engaged in the concave positions 2142 of the contact sections 2141. Thus, the control pieces 3 are limited in the open state. Therefore, the semi-circular arc shaped concave positions 2142 are well adapted to fit the control sections 33 of the control pieces 3 after the control sections 33 are rotatably supported on the semi-circular arc-shaped concave positions 2142, so as to provide resistance and retention force, and ensure that the control pieces 3 are elastically abutted against and match with the semi-circular arc-shaped concave positions 2142.

Each clip edge portion 214 has a clip section toward the bus bar 22. A free end of each clip section 2143 is bent outward and points toward the bus bar 22. Specifically, an included angle between each clip section 2143 and the bus bar 22 is an acute angle. By setting the included angle between each clip section 2143 and the bus bar 22 as the acute angle, an angle of a clamping space is defined. When the control pieces 3 directly press on the clip edge portions 214, the control pieces 3 correspondingly drive the clamping sections 2143 to move close or away from the bus bar 22. The spring bow portions 212 impart elastic restoring force to the clamping edge portions 214 and the clamping sections 2143 after the clamping edge portions 214 and the clamping sections 2143 are pressed.

Figure 17:
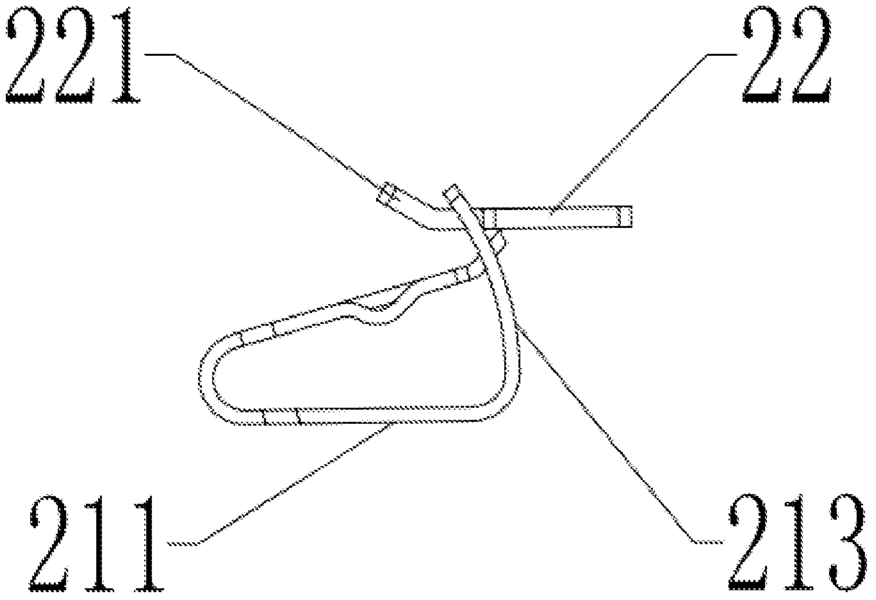
FIG. 17 is another schematic diagram of the spring clip g shown in FIG. 15.

As shown in FIGS. 16-18, in one embodiment, each frame portion 213 comprises two side edges 2131 spaced apart from each other, and a retaining edge 2132 connecting the two side edges 2131. The two side edges 2131 and the retaining edge 2132 of each frame body form a wire passing window 2133. The side edges 2131 are vertically bent along the support portions 211 to ensure that the retaining edges 2132 are tightly fastened to the bus bar 22. Different from the existing way in which a conventional bus bar and conventional clamping springs 21 are oppositely arranged up and down, the bus bar 22 and the clamping springs 21 in the embodiment are connected and matched with each other in dislocation. Specifically, the bending side edges 2131 forming on the support portions 211 are snapped on the bus bar 22 through the retaining edges 2132, so as to realize the close arrangement between the clamping springs and the bus bar 22, thereby defining the clamping spaces that are elastic.

Specifically, the bus bar 22 comprises extending portions 221 matched with the wire passing windows 2133. Each extending portion 221 is bent upward and abuts against a corresponding retaining edge 2132. Therefore, each frame portion 213 vertically bent along one end of a corresponding support portion 211 is snapped on a corresponding extending portion 221.

A free end of each the clamping section 2143 passes through a corresponding wire passing widow 2133 to abut against the bus bar 22.

In one embodiment, a plurality of integrated clamping springs 21 are arranged side by side, and the clamping springs 21 share a same bus bar 22. The plurality of clamping springs 21 are integrally connected through the support portions 211. The spring bow portions 212 arranged on the support portions 211 and the clip edge portions 214 arranged opposite to the spring bow portions 212 are arranged separately from each other, so as to form the clamping spaces corresponding to the wire inserting holes 112 on the bus bar 22. The external wires are electrically connected to each other through the bus bar 22.

Figure 15:
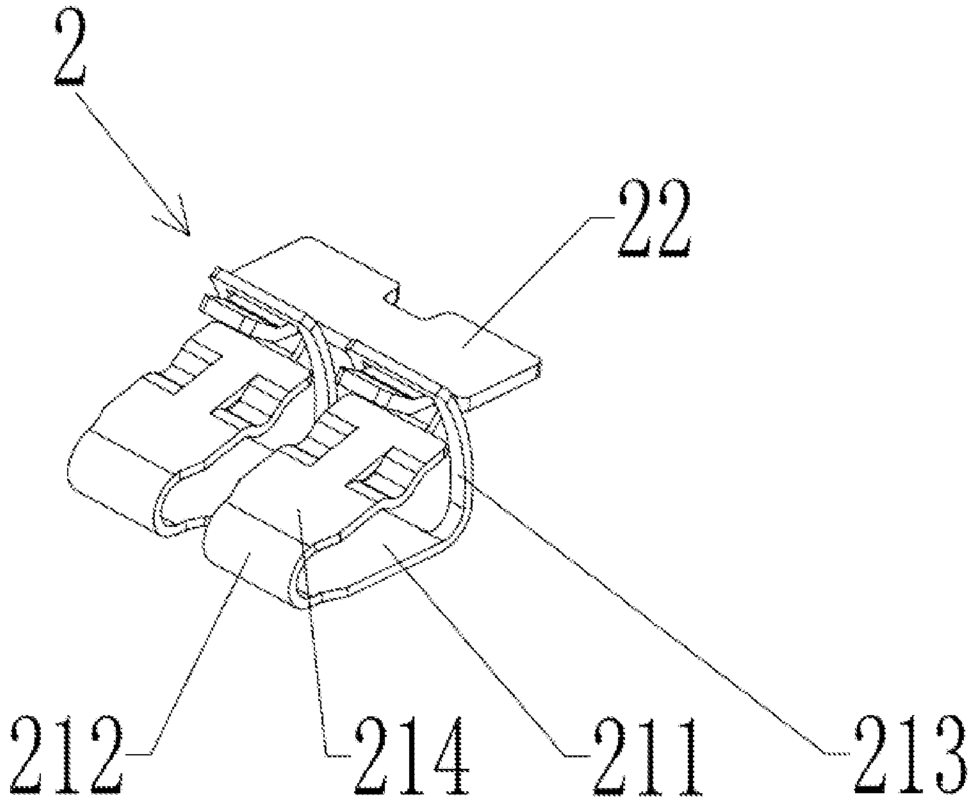
FIG. 15 is another schematic diagram of a spring clip of the electrical connector according to one embodiment of the present disclosure.

As shown in FIGS. 15 and 17, in one embodiment, each support portion 211 is integrally formed with a corresponding spring bow portion 212 and a corresponding frame portion 213. Each spring bow portion 212 is integrally formed with a corresponding clip edge portion 214. Specifically, the bus bar 22 and the clamping springs 21 are provided separately from each other. The support portions 211 are parallel to the bus bar 22. Obviously, portions of each clamping spring 21 is integrally bent and formed into a clamp structure, which is convenient for mass production and has a better pressing force. Further, the separately arranged bus bar 22 and the clamping springs 21 are arranged on different sides of the insulating housing, which facilitate the disassembly and assembly of the spring clip 2 in the insulating housing.

In particular, the bus bar 22 and the support portions 211 are arranged in parallel, so that the spring clip formed by assembly of the clamping springs 21 and the bus bar 22. The bus bar 22 and the support portions 211 are assembled and limited in the insulating housing to form the spring clip, which effectively improve the quick installation, operation, and maintenance of the spring clip 2 arranged inside.

As shown in FIG. 13 and FIG. 14, in one embodiment, the bus bar 22 is arranged in the rear cover portion, and the clamping springs 21 are correspondingly arranged in the base 11. The clamping springs 21 cooperate with the bus bar 22 to form the clamping positions for the wires. Portions of the control pieces 3 are rotatably inserted into and support on the housing body of the insulating housing. The control pieces are openable with respect to the insulating housing to compress or release the clamping springs 21, thereby correspondingly opening or closing the clamping positions.

In the above embodiment, different from a conventional way that the conventional clamping springs and the bus bars 22 are arranged opposite each other up and down, in the embodiment, by arranging the bus bar 22 in the rear cover portion of the cover 12 and arranging the clamping springs 21 in the base 11, the bus bars 22 and the clamping springs 21 are arranged on different sides of the insulating housing, which avoids shortening of the wire inserting spaces, increases effective inserting length when the external wires enter the clamping positions, and improves the clamping efficiency of the spring clip. By such configuration, Portions of the control pieces 3 are rotatably pressed on and support on the clamping springs 21, so as to realize quick and effective opening and closing operation of the clamping positions.

The bus bar 22 is arranged on one side of the cover 12, and the clamping springs 21 are arranged on one side of the base 11, so that mutual interference during the installation process is greatly reduced between the metal bus bar 22 and the metal clamping springs 21 that are arranged at different positions of the insulating housing positions and achieve fast and stable disassembly and assembly of the metal bus bar 22 and the metal clamping springs 21.

Figure 19:
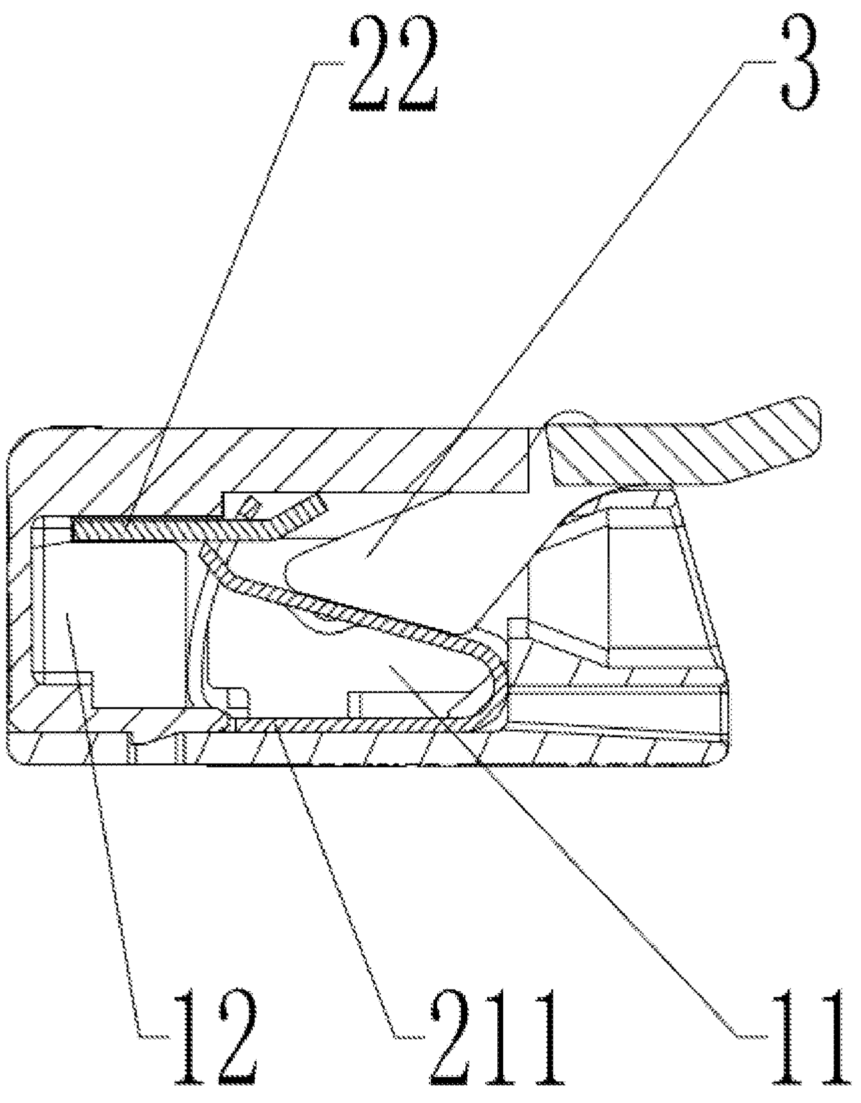
FIG. 19 is another cross-sectional schematic diagram of the electrical connector shown in FIG. 13.

As shown in FIGS. 15 and 19, in one embodiment, the bus bar 22 is detachably abutted and disposed on an upper side of an inner space of the rectangular frame structure. Specifically, the rectangular frame structure is a hollow frame body. Retaining slots (not shown in the drawings) are provided on an upper inner wall of the rectangular frame structure, so that the bus bar 22 is quickly and horizontally inserted therein.

The outer wall sections 121 extend into the hollow upper portion 111 of the base 11 along the length direction of the outer wall sections, and the clamping springs 21 are correspondingly arranged on an inner wall of the base 11 facing the hollow upper portion 111. Therefore, on the one hand, the outer wall sections 121 are inserted into the hollow upper portion 111 defined by the base 11, and on the other hand, the outer wall sections 121 are matched with the base 11 to shield the inner space of the base 11.

It should be mentioned that a rotating supporting area of each of the lever arm sections 31 of each of the control pieces 3 forms a rotating axis. The lever arm sections are spaced apart from each other. Each of the control pieces 3 is rotatably supported in the insulating housing 1 around a corresponding rotating axis. The rotating supporting area of each of the lever arm sections 31 is configured to compress or release the spring clip 2 when each of the control pieces 3 is rotated from the opening position or the closing position. At this time, the spring clip 2 correspondingly clamp or release the wires in the wire inserting spaces.

Each of the control sections 33 extends outwardly along the respective lever arm section 31. The two control sections 33 in the rotating supporting area of each of the control pieces 3 have a greater distance than the distance between the two lever arm sections 31 of each of the control pieces.

Therefore, the contact area between the wide control sections 33 and the concave positions 2142 is increased, which further facilitate the pressing of the control pieces 3 on the clip edge portions 214. Each two control section 33 of each of the control pieces 3 are oppositely formed on an outer side of each lever arm section 3, which facilitates the opening and closing operation of the control pieces 3 and allows the wires to pass through the gaps K until clamped in the clamping positions.

Figure 20:
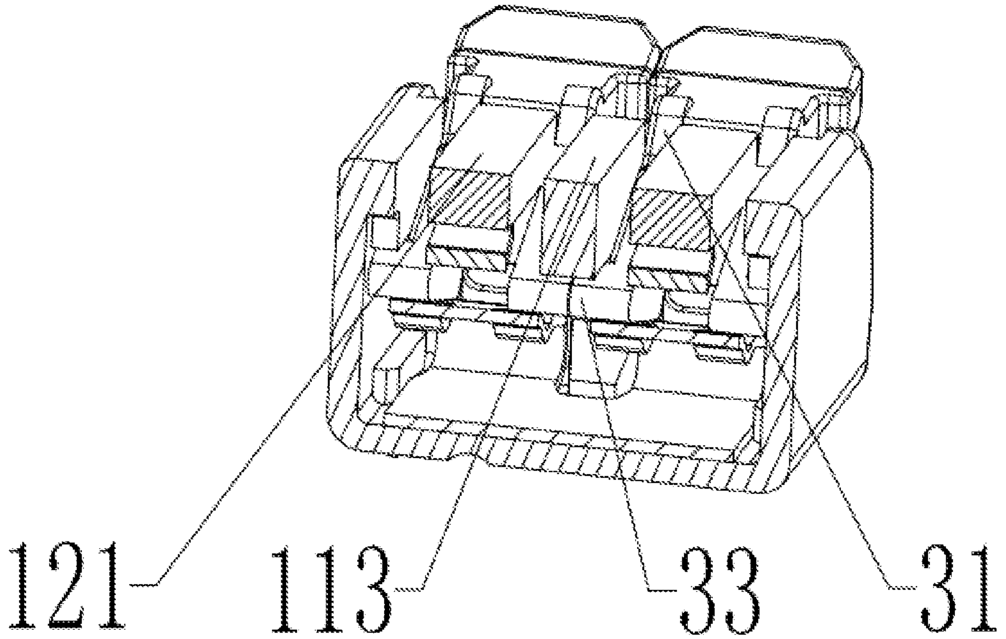
FIG. 20 is another cross-sectional schematic diagram of the electrical connector according to one embodiment of the present disclosure.

As shown in FIG. 20, two adjacent control sections 33 of any of the two control pieces 3 are arranged side by side in the insulating housing 1. The adjacent lever arm sections 31 of the two control pieces 3 are separated by the insulating housing. Specifically, the adjacent lever arm sections 31 of the control piece 3 are separated by the partition portion 113. The two adjacent control sections 33 of one control piece connect and cooperate with each other though the corresponding control sections 33, so on the one hand, the two adjacent control sections 33 of each of the control pieces is leaning against each other, and on the other hand such configuration makes an interior of the electrical connector compact and reasonable. Furthermore, the lever arm sections 31 are spaced apart from each other, so as to facilitate the opening and closing operations of each of the control pieces independently, and avoid accidental touches and the like.

The above are only optional embodiments of the present disclosure, and the protection scope of the present disclosure is not limited to the above-mentioned embodiments. All technical solutions that belong to the idea of the present disclosure should fall within the protection scope of the present disclosure.

What is claimed is:

1. An electrical connector, comprising: an insulating housing, a spring clip disposed in the insulating housing and control pieces configured to open the spring clip;

wherein the insulating housing comprises outer wall sections separately corresponding to wire inserting spaces defined in the insulating housing; each of the outer wall sections at least partially extends into a gap formed by a corresponding control piece when the control pieces are switched to a closed state; moving spaces are defined at an outside of two sides of each of the outer wall sections; the control pieces perform an opening operation and a closing operation in the moving spaces;

wherein when the control pieces are in an open state, the spring clip is observed along the moving spaces; along a width direction of the spring clip, the spring clip is at least partially exposed in projections of the moving spaces along an up-down direction of the moving spaces.

2. The electrical connector according to claim 1, wherein each of the control pieces comprises two lever arm sections configured to partially rotatably insert into and support the insulating housing, the two lever arm sections of each of the control pieces are spaced-apart from each other; each of the control pieces comprises a crosspiece away from a rotating supporting area of the two lever arm sections; each crosspiece connects the two lever arm sections of each of the control pieces to form a lever arm;

wherein when the control pieces are in the closed state, the lever arm sections cooperate with the outer wall sections, so the lever arm sections and the outer wall sections are at least partially arranged above and shield the spring clip corresponding to the moving spaces.

3. The electrical connector according to claim 2, wherein the insulating housing comprises a base and a cover matched with the base; a first side of the base defines wire inserting holes; the cover is detachably engaged with a second side of the base;

each of the wire inserting holes is matched with a corresponding outer wall section; each of the wire inserting holes is arranged opposite to the corresponding outer wall section; the cover and the base are connected with and matched with each other, after the base is docked with the cover, the outer wall sections is arranged above the base to shield wire inserting spaces formed in the insulating housing.

4. The electrical connector according to claim 3, wherein the outer wall sections are arranged at intervals on a front end side of the base; each of the outer wall sections are integrally formed; a first end of each of the outer wall sections is snapped in the cover arranged on a rear end side of the base.

5. The electrical connector according to claim 4, wherein a second end of each of the outer wall sections close to the front end side of the base is sunken to form a step position, each gap formed by the corresponding control piece is formed between two lever arm sections of the corresponding control piece; each crosspiece abuts against a corresponding step position, so each crosspiece is at least partially received in a corresponding stepped position, when the control pieces in the closed state, the control pieces are horizontally limited on the base.

6. The electrical connector according to claim 3, wherein the cover comprises a rear cover portion and the outer wall sections extending outward along the rear cover portion; the outer wall sections extend into a hollow upper portion of the base along a length direction of the outer wall sections; one end of each of the outer wall sections is suspended in the hollow upper portion of the base;

wherein the one end of each of the outer wall sections is suspended in the insulating housing; in a suspended manner, an avoidance area is formed in an extending direction of each of the outer wall sections; when the control pieces are in the open sate, the wire inserting spaces are directly observed through the avoidance areas of the outer wall sections;

when the control pieces are in the closed state, the avoidance areas are at least partially covered by the crosspieces; the lever arms cooperate with the outer wall sections to at least partially arrange above and shield the spring clip corresponding to the moving spaces close to the avoidance areas.

7. The electrical connector according to claim 6, wherein each gap formed by the corresponding control piece is formed between the two lever arm sections of the corresponding control piece, and forms a boundary with the one end of a corresponding outer wall section by the crosspiece of the corresponding control piece, so that each crosspiece at least partially fills the avoidance area of a corresponding outer wall section.

8. The electrical connector according to claim 6, wherein the avoidance areas are located on an upper side of the wire inserting holes, an edge of the one end of each of the outer wall sections and an oblique end of a corresponding wire inserting hole are mutually dislocated.

9. The electrical connector according to claim 6, wherein the avoidance areas are formed on one end side of the hollow upper portion of the base that is not filled by the outer wall sections.

10. The electrical connector according to claim 4, wherein a partition portion is arranged between two adjacent wire inserting holes; the front end side of the base extends backward to form the partition portion; the partitions are arranged between the two adjacent wire inserting holes and extends horizontally to define wire inserting spaces spaced apart from each other; the partition portion is engaged with and docked on the cover.

11. The electrical connector according to claim 10, wherein the partition portion is integrally formed on the front end side of the base; the partition portion is flush with the outer wall sections and forms part of the moving spaces with the outer wall sections;

wherein the control pieces are in the closed state, the outer wall sections cooperate with the partition portion to shield the wire inserting spaces in a width direction of the wire inserting spaces.

12. The electrical connector according to claim 1, wherein a rotating supporting area of the each of the lever arm sections of each of the control pieces forms a rotating axis; the lever arm sections are spaced apart from each other; each of the control pieces is rotatably supported in the insulating housing around a corresponding rotating axis; each rotating supporting area comprise a control section; the control sections are configured to compress or release the spring clip when the control pieces are rotated, so wires are clamped in the wire inserting spaces.

13. The electrical connector according to claim 12, wherein the control sections are widen and extend outwards along the lever arm sections, each two control sections of each of the control piece have a greater distance in the rotating supporting areas of the lever arm sections than a distance between each two lever arm sections of each of the control pieces.

14. The electrical connector according to claim 12, wherein two control pieces disposed side by side in the insulating housing are provided; the control sections are adjacent to each other; and adjacent lever arm sections of the two control pieces are separated by the insulating housing.

* * * * *